US006799197B1

(12) United States Patent
Shetty et al.

(10) Patent No.: US 6,799,197 B1
(45) Date of Patent: Sep. 28, 2004

(54) SECURE METHOD AND SYSTEM FOR USING A PUBLIC NETWORK OR EMAIL TO ADMINISTER TO SOFTWARE ON A PLURALITY OF CLIENT COMPUTERS

(75) Inventors: Satish Shetty, Hillsboro, OR (US); Victor Kouznetsov, Aloha, OR (US); Dan Melchione, Beaverton, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 744 days.

(21) Appl. No.: 09/652,089

(22) Filed: Aug. 29, 2000

(51) Int. Cl.[7] .............................................. G06F 15/16
(52) U.S. Cl. ........................ 709/203; 709/228; 709/207; 709/219; 709/220; 709/227; 709/229
(58) Field of Search ................................. 709/228, 203, 709/219–221, 226–229, 207, 217, 223

(56) References Cited

U.S. PATENT DOCUMENTS

| | | | | |
|---|---|---|---|---|
| 5,892,904 A | * | 4/1999 | Atkinson et al. | 713/201 |
| 5,923,885 A | * | 7/1999 | Johnson et al. | 717/176 |
| 5,933,647 A | * | 8/1999 | Aronberg et al. | 717/178 |
| 5,951,644 A | * | 9/1999 | Creemer | 709/229 |
| 5,958,010 A | * | 9/1999 | Agarwal et al. | 709/224 |
| 5,960,170 A | * | 9/1999 | Chen et al. | 714/38 |
| 5,983,012 A | * | 11/1999 | Bianchi et al. | 703/23 |
| 6,009,103 A | * | 12/1999 | Woundy | 370/401 |
| 6,009,274 A | * | 12/1999 | Fletcher et al. | 717/173 |
| 6,035,423 A | * | 3/2000 | Hodges et al. | 714/38 |
| 6,085,320 A | * | 7/2000 | Kaliski, Jr. | 713/168 |
| 6,094,731 A | * | 7/2000 | Waldin et al. | 714/38 |
| 6,119,157 A | * | 9/2000 | Traversat et al. | 709/220 |
| 6,151,643 A | * | 11/2000 | Cheng et al. | 710/36 |
| 6,154,769 A | * | 11/2000 | Cherkasova et al. | 709/207 |
| 6,362,836 B1 | * | 3/2002 | Shaw et al. | 345/744 |
| 6,438,549 B1 | * | 8/2002 | Aldred et al. | 707/9 |
| 6,449,640 B1 | * | 9/2002 | Haverstock et al. | 709/219 |
| 6,453,352 B1 | * | 9/2002 | Wagner et al. | 709/229 |
| 6,510,466 B1 | * | 1/2003 | Cox et al. | 709/229 |
| 6,622,150 B1 | * | 9/2003 | Kouznetsov et al. | 707/200 |

\* cited by examiner

*Primary Examiner*—Ario Etienne
*Assistant Examiner*—Ramy Osman
(74) *Attorney, Agent, or Firm*—Silicon Valley IP Group, PC; Kevin J. Zilka; Christopher J. Hamaty

(57) ABSTRACT

A secure method and system for administering to software on a plurality of client computers is disclosed. One or more pre-set policies for one or more client computers may be stored on and transmitted in a secure manner from a central server that is under the control of a system administrator to the client computers over a public network or e-mail systems. The central server is preferably an HTTP server containing software for creating packages of information and for protecting the integrity of the packages during transmission over a virtual secured pipe. The packages may contain policy for the various clients that are to be maintained. The policy may comprise software configurations for software that resides on the clients, software to be installed on one or more clients, or any other information and data that is needed to maintain and manage the clients. Preferably each client also contains software for creating packages and for verifying that incoming packages were created and sent by an authorized and trusted server. Packages that are created by the clients may contain the current configurations for software residing on the client. The client software is preferably capable of transmitting and getting packages to and from the server over the secure pipe. The secure pipe may be established over a public network or e-mail system using HTTP, SMTP, MAPI, and WAP protocols. Thus, as long as the clients have e-mail, Internet access, or access to other public networks, they may be managed and maintained by a central server.

15 Claims, 7 Drawing Sheets

Figure 4
Package File Format

| CHAR[2] | Package Signature | String "PO" |
|---|---|---|
| LONG | Offset to data | |
| INT16 | Index | |
| INT16 | Number of baby pkgs | |
| LONG | Data size | |
| CHAR[64] | Sender GUID, | |
| CHAR[64] | Package GUID | |
| INT16 | Package Type | 1 = key package; 2 = data package |

<Package info values>
<First file info...>

| INT16 | Pkg index | |
|---|---|---|
| INT16 | Destination file name length | |
| CHAR | Destination file name | |
| LONG | File size | |

<Begin First file data>
<End First file data>
Second file info ... >

| INT16 | Pkg index | |
|---|---|---|
| INT16 | Destination file name length | |
| CHAR | Destination file name | |
| LONG | File size | |

Begin Second file data>
<End Second file data>
.<Third file info..>
<Begin Third file data >
..<End third file data>
<PGP Digital Signature (44 bytes) >
<End>

Package flow Diagram

Communication Layer

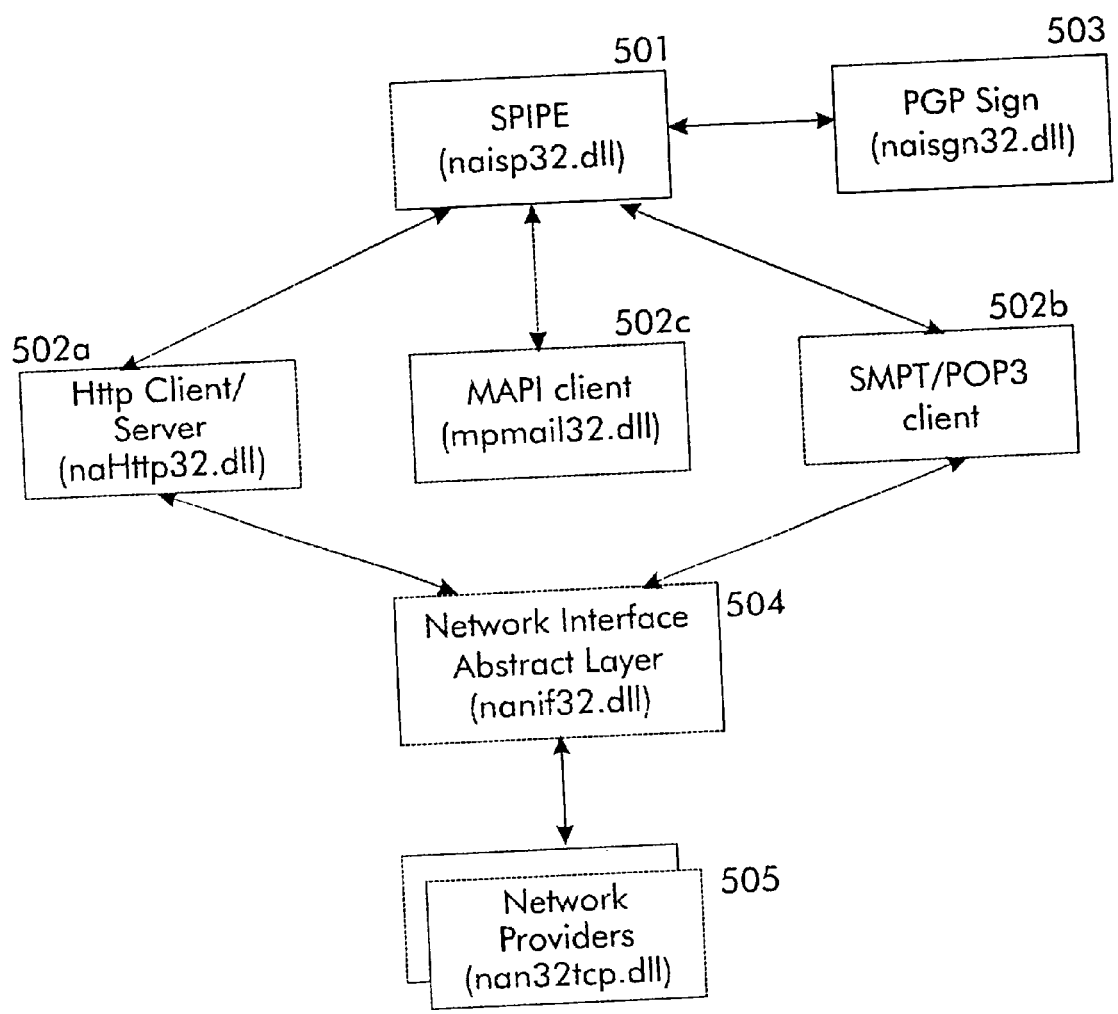

SECURE METHOD AND SYSTEM FOR USING A PUBLIC NETWORK OR EMAIL TO ADMINISTER TO SOFTWARE ON A PLURALITY OF CLIENT COMPUTERS

BACKGROUND OF THE INVENTION

1. Field of the Invention

The present invention relates to policy administration for a network of computers. In particular, the present invention provides a method and system for administering pre-set policies to one or more client computers having access to a public network or e-mail by, among other things, sending packages of information between a policy orchestrating server and the client computers over the public network or e-mail with the aid of a secure communication pipe. The client computers that are to be maintained may also be part of one or more distinct wide area networks, or they may be stand-alone computers.

2. Description of the Related Art

Wide area computer networks are often maintained by a system administrator. One of the system administrator's functions is to set policy for and to maintain software on the computers comprising the network. Typically, the system administrator decides, among other things, which software products are to be installed on the client computers and how that software is to be configured. In most wide area networks, the system administrator can communicate with each computer on the network in a secure manner because the computers are connected together with a private communication link. Messages, files, and data can be sent over the private communication link from one or more central servers to each computer on the network, and the computers on the network can use the private communication link to send messages, files, and data to one or more central servers.

Most wide area networks are also set up so that the system administrator can use a central server to configure software on the other computers in the network. The system administrator can issue and control policy for the wide area network and can update and configure software on any or all computers within the network. One typical and routine practice of a computer network system administrator is to periodically update virus scanning software on the computers in the administrator's network.

One of the problems faced by large organizations with multiple locations is that each location often maintains a separate wide area network. Thus, it is difficult for one administrator to: set policy, configure, and maintain every workstation under the organization's control. Moreover, it is of utmost importance that a high level of trust exist between a system administrator and the client computers to be administered. A person or entity successfully impersonating a system administrator can devastate an organization. In order to maintain the high level of security needed, some large organizations maintain dedicated and secure lines between multiple locations so that the system administrator can control all workstations owned or controlled by the organization. Nevertheless, even when dedicated lines are established, there are inevitably a few workstations within an organization, such as laptop computers, that are not connected to the administrator's central server in a secure manner and therefore are not properly maintained and managed. Moreover, the cost of maintaining dedicated lines to small offices where there are few workstations can be prohibitive.

On the other hand, most organizations—even small ones—have computers and networks that are configured to allow users to browse the World Wide Web portion of the Internet. And most mobile users have access to e-mail. Thus, it would be advantageous to use the Internet or e-mail as a means for configuring, setting policy for, and maintaining workstations owned and controlled by an organization. One major drawback, however, is that heretofore there has been no secure way to perform system administration tasks over public networks, such as the Internet, or e-mail systems. Therefore, a secure system and method that allows a system administrator to use the Internet or e-mail to set the policy for all computers owned or controlled by a given organization, regardless of whether all the computers are on the same wide area network, would provide a tremendous benefit in terms of cost and ease of administration.

It is thus an object of the present invention to allow a system administrator to set policy for and to administer software on a plurality of client computers that have access to e-mail or a public network, such as the Internet.

It is also an object of the present invention to allow a system administrator to manage one or more client computers having access to a public network, such as the Internet, or e-mail, regardless of how many diverse wide area networks the client computers may be part of.

Because most wide area networks employ firewalls and other security measures, it would be advantageous to have a system and method that would allow a system administrator to access, and to send information to and from, workstations that are part of secure networks. Thus, it is a further object of the present invention to provide a secure means for sending packages of information to and from a plurality of computers, which may reside on different wide area networks, regardless of the security protocols established by the individual wide area networks of which the computers reside.

SUMMARY OF THE INVENTION

The present invention provides a system and method for using a public network, such as the Internet, or e-mail systems to set policy for and to manage software on a plurality of client computers by sending packages of information between a Policy Orchestrator ("PO") Server, which is under the control of a system administrator, and one or more of the client computers that contain software known as Policy Orchestrating Agents ("PO Agents"). The PO Server and the PO Agents communicate with each other over a public network, or e-mail, with the aid of a secure communication path known as an SPIPE. The SPIPE allows packages of information to be sent—in a secure manner—between the PO Server and the PO Agents residing on various client computers that are connected to a public network, such as the Internet, or have access to e-mail systems.

In the preferred embodiment the PO Server resides on a HTTP server that preferably contains a software repository for storing software to be installed on the client computers. The PO Server may contain or be interfaced with a Light Weight Data to Access Protocol ("LDAP") database. The LDAP database is used to store policies set by an administrator for the various client computers containing PO Agents. The policies for each client may be stored in separate files in the LDAP database. Preferably, each PO Agent is assigned a unique identifier and has a public/private encryption key pair. The public key for each PO Agent is provided to the PO Server. This gives the PO Agents the ability to digitally sign packages of information that they may generate before sending the packages to the PO Server.

Because the PO Server has the PO Agents public key, it can verify that a package came from an authorized PO Agent and has not been altered while in route to the PO Server. Likewise, the PO Server has a public/private encryption key pair and its public key is distributed to each PO Agent. Thus, the PO Server can also digitally sign packages of information before they are transmitted to a PO Agent and the receiving PO Agent can confirm that a package came from an authorized and trusted PO Server and has not been altered while in route.

As part of a preferred protocol, each PO Agent periodically checks-in with the PO Server. During this routine check-in procedure, the PO Agent sends to the PO Server a package containing, among other things, the current configuration of the client computer on which the PO Agent resides. Preferably, the package contains a header identifying the PO Agent that sent it, data or other information, which may be in the form of files, and a digital signature that was generated using the PO Agents private key.

In general, the packages are capable of containing various types of robust data, including—but not limited to—policies set by a system administrator, such as configuration values for software residing on clients, information for virus scanning software (such as, the types of files to scan, the drives to scan, specific DAT files, etc.), configuration information for other software (such as, for example, default settings for software specific parameters), and any other information needed to manage and maintain software used by client computers. Packages may also contain, for example, software applications for client computers, software updates, music files, video files, certificate authority data, and encryption keys. Regardless of the data in the package, the package may be sent to the PO Server (or to a PO Agent) in a secure manner over a public network or e-mail with the aid of an SPIPE.

In one embodiment, the communication method employed by the SPIPE uses a Hypertext Transfer Protocol ("HTTP"). One advantage of using HTTP is that most wide area networks support communication with HTTP. More importantly, wide area networks that employ firewalls and other security measures usually allow computers on the wide area network to browse the Internet. Thus, the present invention allows the PO Server to administer to a plurality of computers on a plurality of different individual wide area networks, regardless of the security measures employed by the wide area networks. In an alternative embodiment, the present invention could employ an SPIPE that uses STMP, MAPI or WAP. The SPIPE would thus establish communications between the PO Server and the PO Agents using e-mail and wireless protocols. This would advantageously allow a central administrator to administer to mobile clients having installed PO Agents, such as laptops and Personal Digital Assistants ("PDAs"), where the mobile clients have e-mail access or access to wireless Internet service providers.

In a preferred embodiment, the present invention operates according to the following procedure: A PO Agent residing on a client computer periodically sends a package to a PO Server. The package contains, a header identifying the sending PO Agent, the current configuration of the client computer, and a digital signature that is generated by the sending PO Agent. Upon receiving the package, the PO Server uses the public key for the sending PO Agent to verify the signature for the package. If the signature cannot be verified, the package is ignored. However, if the signature verifies, the PO Server examines the package containing the current configuration of a client and checks a database to determine if any pre-set policy has been established for the particular PO Agent that has checked in. If there is a policy for that PO Agent, the PO Agent gets from the PO Server a package containing the policy. Before the package is transmitted over the SPIPE a header containing an identifier for that PO Agent is appended to the package. Before the package is transmitted, it is signed with the PO Server's private key, and the signature is appended to the package. Thus, the PO Agent can—upon receipt of the package—use the PO Server's public key to verify that it came from the PO Server and that it has not been altered by an unauthorized entity while in route.

In addition to policy, software or other relevant files for a particular client may be placed in a package and transmitted from the PO Server to the PO Agent. The package containing the software or other relevant files will be digitally signed in the same manner described above.

In the embodiment described above, the PO Agent did not receive a new policy for its client until it checked-in with the PO Server. In some situations, however, it may be advantageous for the PO Server to prompt the PO Agent to check-in with the PO Server before its regularly scheduled check-in. Thus, it may be desirable to configure the PO Server to send a message to PO Agents prompting them to check-in and get a package. To accomplish this earlier then scheduled checking-in, the PO Server preferably uses a pinging process.

In the embodiments described above, the packages are digitally signed but not encrypted. While it is possible to encrypt the packages, encryption policies and laws in various countries must be taken into consideration. One preferred alternative to encryption is to scramble the data in the packages before they are sent.

DESCRIPTION OF THE DRAWINGS

FIG. 4 is a table setting forth an example of a preferred package file format.

FIG. 7 illustrates preferred SPIPE implementation modules.

DETAILED DESCRIPTION

Figure 1:
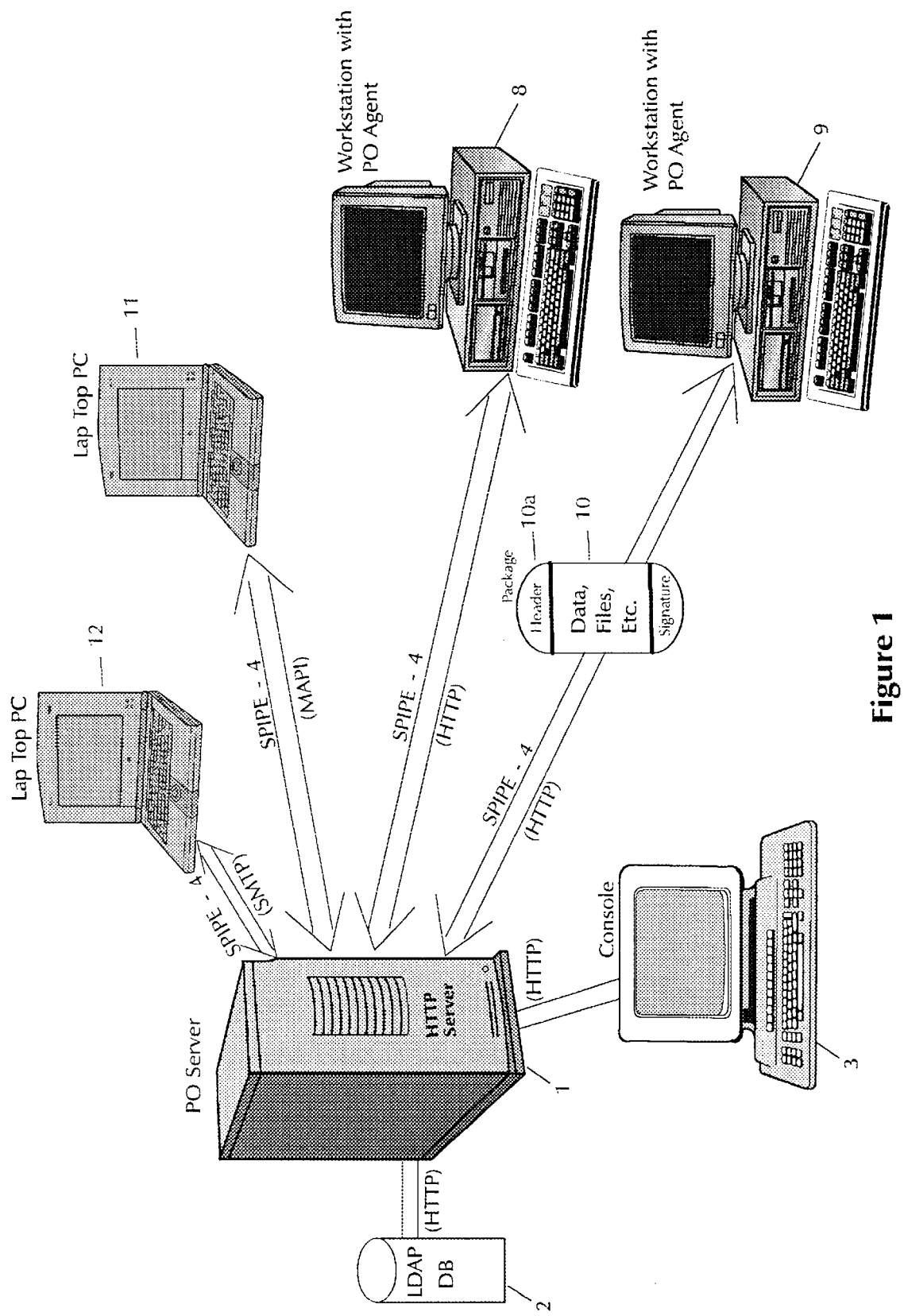
FIG. 1 illustrates one embodiment of the system architecture employed by the present invention.

Referring to FIG. 1, in a preferred embodiment the present invention comprises a Policy Orchestrating Server ("PO Server") 1 residing on an HTTP Server. A system administrator uses the PO Server 1 to set the policy for and to manage software on one or more of client computers 8, 9, and 12 that contain software known as PO Agents. The present invention allows a system administrator to use a public network, such as the Internet, or e-mail systems to manage and/or configure software on one or more client computers, regardless of whether the client computers are part of different wide area networks and regardless of whether each of the wide area networks contain firewalls or other security measures. The present invention employs a secure means for transmitting packages 10 of information between the PO Server 1 and client computers 8, 9, 11 and 12 that contain PO Agent software.

The secure means, known as a SPIPE 4, is a virtual communications pipe that employs standard data transmission lines, such as telephone lines, cable lines, T1 lines, satellite links, cellular phone systems, and other standard data transmission links. The SPIPE 4 provides a secure means for transmitting packages 10 of information between PO Servers and PO Agents. It may employ digital signature technology to ensure that a package came from an authorized PO Agent or Server and has not been altered in route. As is known in the art, digital signatures are unforgeable pieces of data that assert that a named entity sent the items to which the signatures correspond and that the items have not been altered since they were sent.

Most digital signing function uses public/private encryption key pair technology. In general, a private key is used to encrypt data and a public key is used to decrypt the data. For each private key there is a unique public key that can decrypt data encrypted with the private key. Thus, if an item is encrypted with a specific private key, only entities that have a corresponding public key for that private key can decrypt the item. Furthermore, the corresponding public keys will only decrypt items encrypted with the corresponding private key. Thus, a receiving entity that has a public key for a sending entity can decrypt a message encrypted by the sending entity and can be sure that the encrypted message came from the sending entity and only the sending entity.

Entities that have private keys and share their public keys with other entities can also digitally sign items to ensure that the item is not altered in route. Typically, the signing of an item with a digital signature involves two steps. First the item is hashed using a message hashing function. The message hashing function is preferably a one-way hash function. The hash function maps strings of bits to fixed-length strings of bits in a way that make it computationally infeasible to find a given input or output that maps to a particular output or input. Thus, the message hashing function is an algorithm that maps the sequence of bits comprising an electronic record into a smaller set of bits without requiring the use of any encryption key or any secret information. Each electronic record yields the exact same hashed message every time the algorithm is executed. And the method makes it computationally unfeasible for any two electronic records to produce identical results unless they are exactly alike.

Second, the sending entity encrypts the hashed message with its private encryption key and sends the encrypted hashed message along with the original message to a receiving entity. The receiving entity uses a public key for the sending entity to decrypt the hashed message. If the hashed message decrypts with the public key, it could have only come from the sending entity.

The receiving entity then uses the same hashing function that the sending entity used to hash the original message again. If the hashed values match, the message has not been altered. However, if the hashed values do not match, the item has been altered.

The preferred embodiment of the present invention employs standard PGP private and public key digital signing methods that, as is known in the art, function in a manner similar to that described above. Preferably, the key size is 1024 bits and the signature size is 44 bytes. In a preferred embodiment, the signature of the entity sending a package 10 is appended to the package before it is transferred over the SPIPE 4.

In a preferred embodiment of the present invention, the PO Server 1 is connected to a console 3, or other interface device, via a communication link using HTTP. The console may be a workstation or client computer that is accessible to the system administrator. This allows the system administrator to communicate with the PO Server 1. Also, in the preferred embodiment, the PO Server 1 is interfaced with a LDAP database 2. The LDAP database 2 stores, among other things, computer policies that have been set by the system administrator for each client computer. These policies may include, for example default values for specific software, such as WinZip,® DAT files for virus scanning software, etc. The PO Server 1 may also contain a software repository for storing software or software updates to be installed on client computers.

PO Agent software is provided on each client computer. The PO Agent is preferably installed on the client computers with an installation routine. In a preferred embodiment, along with the installation routine, a routine for generating a public/private key pair for each PO Agent is provided to each client. The PO Agents can thus encrypt data and/or generate digital signatures in the manner described above. In addition, the PO Server has a public/private key pair for encrypting and/or digitally signing bundles of data. The PO Server's public key may be provided to each PO Agent along with the install routine so each PO Agent may verify digital signatures generated by the PO Server. Thus, the PO Server can send, in a secure manner, packages 10 of information to the PO Agents residing on client computers.

In order for the PO Servers to verify signatures for PO Agents—and vice-versa—the PO Server must have the PO Agent's public key and the PO Agent must have the PO Server's public key. To provide the PO Server with the PO Agents' public keys, when a PO Agent is installed on a client computer, the client computer generates its public/private key pair and then encrypts its public key with the PO Server's public key and transmits its public key to the PO Server. This helps to ensure that the public key received by the PO Server came from an authorized PO Agent. The PO Server may, in the preferred embodiment, store the PO Agents' public keys in the LDAP database 2.

The present invention allows for the creation of packages of information 10 by either the PO Server 1 or the PO Agents residing on workstations 8, 9, 11, and 12. As previously described, the packages may contain robust information, including software to be installed on the workstations 8, 9, 11, and 12, configuration data for software presently residing on the workstations, or other information that is typically used and sent by a system administrator in the course of maintaining a computer network. Each package is digitally signed by the entity that creates it, and may in some embodiments be encrypted. In the preferred embodiment, the packages 10, in addition to having digital signatures, contain a header 10a having a package instance identifier, which is a globally unique identifier ("GUID"). Each PO Agent is assigned a GUID for identification purposes. GUIDs for the PO Agents are preferably generated during the PO Agent installation process. In the preferred embodiment, the header 10a comprises the GUID for the PO Agent that created the package or, when the package 10 is created by the PO Server, for the PO Agent that the package is destined for.

Figure 2:
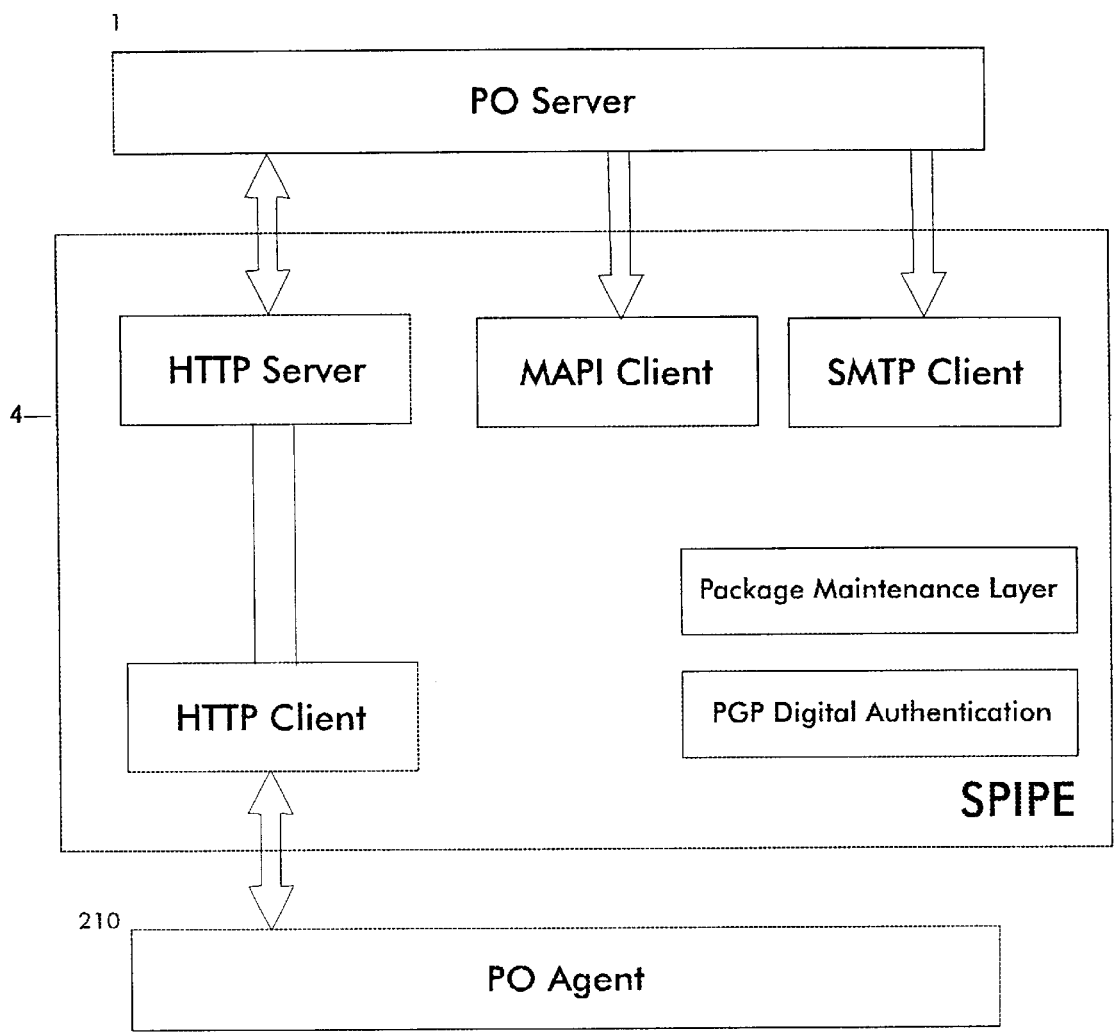
FIG. 2 is a block diagram illustrating the PO Server, the SPIPE, and the PO Agent.

As illustrated in FIG. 2, packages are sent between the PO Server 1 and PO Agents 210—and vice versa—via the SPIPE 4 over a public network or e-mail system. Where the PO Agents 210 are installed on clients 8 having Internet access, the preferred protocol for the. SPIPE 4 is HTTP. This enables the PO Server 1 and various PO Agents 210 that are part of different wide area networks to exchange packages. As an alternative to HTTP, the SPIPE 4 can use SMTP, MAPI, or WAP. This allows an SPIPE to be established between a PO Server 1 and PO Agents 210 residing on mobile clients 11 and 12 without Internet browsing capability, as is often the case with laptop, notebook clients, or personal digital assistants.

The PO Server 1 preferably employs an HTTP server architecture that is designed to handle a large number of clients by employing a state machine model architecture. As is known in the art, state logic control methods allow the uploading and downloading for numerous tasks by dividing the tasks into a discrete number of sub tasks. In the preferred embodiment each sub task is executed separately in one of two work queue threads. Thus, for example, if a network read/write operation is pending, a current thread would finish this task by setting a state to the next state and then exit. A later work queue network read/write callback operation would then come back and continue to execute the next task. If, however, a network read/write operation were not pending, the same thread would do all the tasks and then close the network connection.

Figure 3:
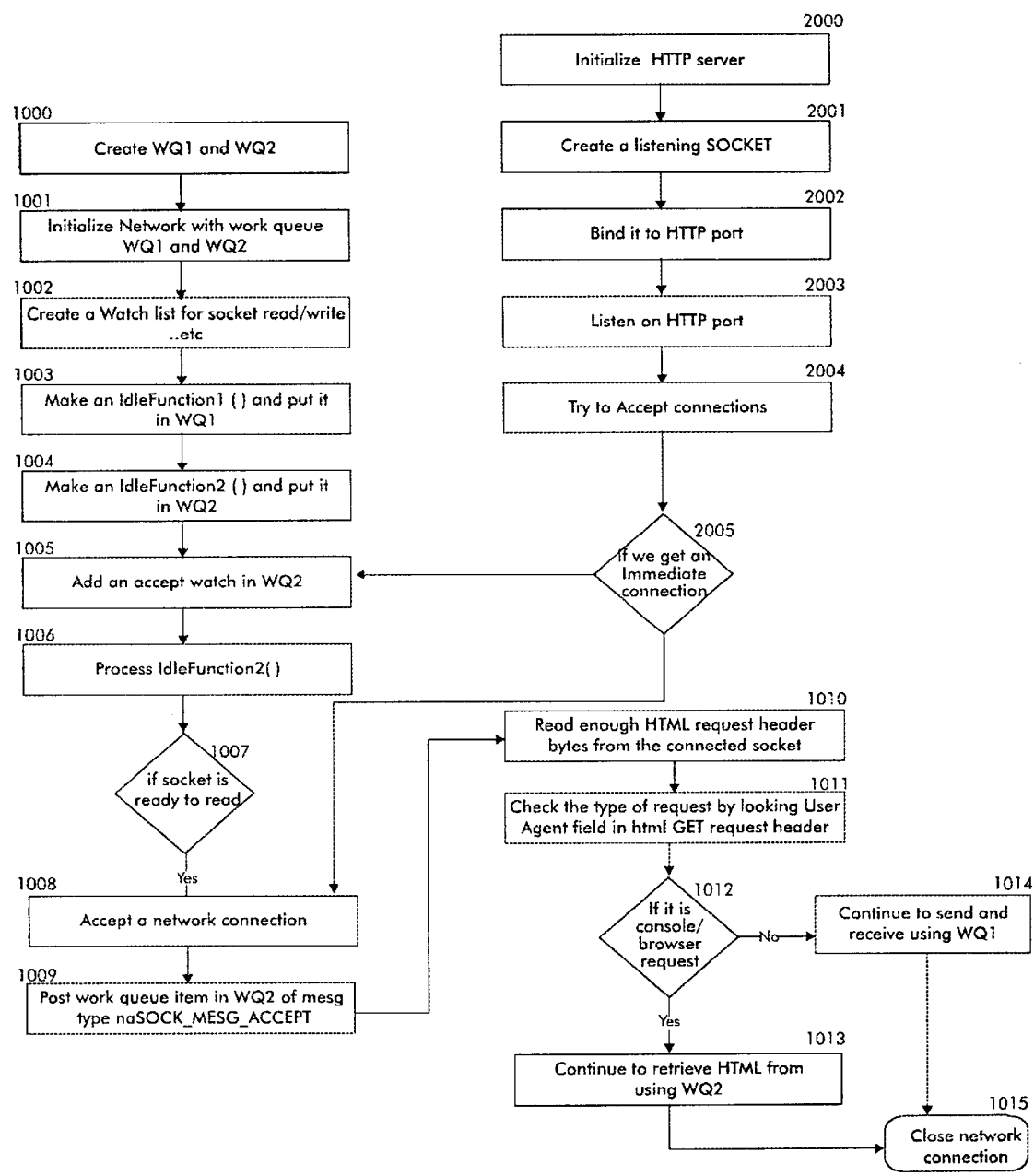
FIG. 3 is a flow chart illustrating a preferred work queue that may be used by the PO Server to process tasks.

FIG. 3 illustrates the implementation and use of work queues that may be employed by the PO Server 1. Steps 1000–1006 illustrate the steps that may be used to set-up work queues on the HTTP server and steps 2004–2005 illustrate the steps that may be used to listen on a socket for incoming commands or data.

At step 1000 two work queues are created. As is known in the art, the work queues comprise jobs and threads. Jobs are usually tasks such as, for example, reading or writing data to or from the network. Threads are typically procedures that specify how a job is to be executed. In other words, a thread is a specific way to execute a job. One work queue, (WQ2) is a high priority work queue while the other work queue (WQ1) is a standard priority work queue. One advantage of using a high priority work queue is that tasks and commands sent from the console will be given a higher priority and thus executed more quickly then tasks and commands originating from clients.

After the WQ1 and WQ2 are created, the network should be initialized with the work queues (step 1001). Typically initialization involves loading appropriate libraries and configuring specific sockets for use by the work queues. A watch list for the socket read/write is then created (step 1002). Typically this step involves creating a read/write job that watches the socket for incoming data and reads the data as it arrives. Next, a first idle function is created for WQ1 (step 1003). This function looks to determine if jobs are pending in the first work queue and executes the pending jobs one by one. Likewise, a second idle function is created for WQ2 (Step 1004) and functions for WQ2 in the same way as the first idle function for WQ1. If a socket connection for WQ2 is detected, the incoming data is put into WQ2 (step 1005). All pending jobs in WQ2 are then processed by idle function 2 (step 1006). The socket is then checked to determine if it is ready to read (step 1007). If it is ready to read a network connection is accepted (Step 1008). After getting a connection, a callback function of message type "naSOCK_MESG_ACCECPT" is put in WQ2 and later this callback function continues the data processing (Step 1009). The HTTP header request is then, at least in part, read (Steps 1010, 1011) to determine if the command being sent is a get or post command. If it is determined that the command or data came from the console (Step 1012) WQ2 will continue to retrieve the data (Step 1013). If on the other hand, the data is not coming from the console the data will be sent to WQ1 (Step 1014). Finally, the network connection will be closed (Step 1015).

The system architecture for the present invention may be conceptualized as two broad categories: A package maintenance layer and a communication layer. The package maintenance layer comprises a means for: package creation, package authentication, getting a package from the PO Server, and sending a package to the PO Server. As discussed above, a package is a collection of files or data that is authenticated and transferred. Packages may be created dynamically so that no file is created on a disk, or other storage device when sending a package. For example, it might be desirable to send updated virus scanning DAT files to every client on a network. Rather than creating a separate package containing the DAT files for each client, the DAT files could be dynamically loaded into packages from the LDAP database and sent to each Agent on each client.

On the receiving end, however, a package file is created so that the entire contents of the package can be verified. Thus, the DAT files in the above example would be put in a file on the receiving client workstation along with other information, such as the package header and digital signature. This allows the signature to be verified by the Agent before the DAT file is used. A typical package file format is shown in FIG. 4.

In the preferred embodiment where the PO Server 1 uses HTTP 1.0 the following functions are supported: GET; POST; HEAD; and DELETE. GET gets the URL data; POST posts data; HEAD gets URL information; and DELETE deletes URLs. One or more of these functions may be customized for use with the SPIPE 4. For example, in some embodiments, the Agent GUID may be placed in the URL data. This is particularly advantageous when a client resides on a network having a firewall because the URL data typically is allowed to pass through the firewall.

To get a package from the PO Server 1, the PO Agent 210 sends its GUID to the PO Agent 210 along with a HTTP Get Request. The PO Server 1 then checks if there are any packages queued for the requesting agent. If there is one or more packages for the requesting PO Agent 210, the packages are sent to PO Agent 210. At every check-in interval, the Agent tries to connect to SPIPE HTTP Server. Once Agent and Server network connection is established, the Agent sends its header information by a SPIPE package. After the Agent has a sent a full package, it waits for HTTP return status code "200 OK" from Server, if the transmission was successful. If the transmission was unsuccessful, the PO Server sends status code "300" to transmission error. Exemplary HTTP Client Get commands are provided in Table 1 below.

TABLE 1

Getting a package from the server
TO get a package from the server Agent sends GUID along with http get request and Server
checks if there are any packages queued for this agent if so sends it to the Agent else it closes
the
http connection. SPIPE http client get command syntax is
"GET spipe:pkg\\ HTTP 1.0 xD\xA"
"User-Agent: Spipe/1.0 \xD\xA"
"AgentGuid: {3E1B11AC-6261-11D3-B908-00105A25E4F9} \xD\xA"
"GET spipe/pkg
?AgentGuid={71321766-5694-11D4-B997-00105A19F539}HTTP/1.0\xD\xA
Accept: application/octet-stream\xD\xA
Accept-Language: en-us\xD\xA
User-Agent: Mozilla/4.0 (compatible; SPIPE/1.0; Windows)\xD\xA
Host: PO_SERVER \xD\xA
Connection: Keep-Alive\xD\xA\xD\xA To post a package to the PO Server 1 the PO Agent 210 sends a command informing the PO Server 1 that a package will be arriving soon. This may be achieved by sending an HTTP header rather than a package header to the PO Server 1 using standard HTTP. Exemplary HTTP post commands are provided in Table 2 below.

TABLE 2

Sending a package to server:
To post a package to server, Agent won't send GUID along with server instead it simply sends a
command saying that a package is going to arrive soon. SPIPE http server receives the package
and it reads the header and extracts agent GUID from the header and then gets agent public key
from the LDAP database for digital PGP signature verification SPIPE http client post command
syntax is below.
"POST spipe:pkg:\\ HTTP 1.0 \xD\xA"
"User-Agent: Spipe/1.0\xD\xA"
POST/spipe/pkg HTTP/1.0\xD\xA
Accept: application/octet-stream\xD\xA
Accept-Language: en-us\xD\xA
Content-Type: application/octet-stream \xD\xA
User-Agent: Mozilla/4.0 (compatible; SPIPE/1.0; Windows)\xD\xA
Host: PO_SERVER\xD\xA
Content-Length: %d\xD\xA
Connection: Keep-Alive\xD\xA\xD\xA In the preferred embodiment, upon receipt by the PO Server 1 of a package 10, a header 10a containing a GUID is extracted, and the GUID is examined. The PO Server 1 uses the GUID to locate from the LDAP database 2 the proper public key for the PO Agent that sent the package. The PO Server 1 then uses standard digital PGP signature verification algorithms to verify the signature in the same or a similar manner to that described above. If the signature on the package cannot be verified, the package will be ignored by the receiving entity.

In one embodiment, however, if the PO Server 1 cannot verify the signature on a package because it does not have a public key from the sending PO Agent, the PO Server 1 may request the public key for the PO Agent. Upon receipt of a request for its public encryption key, the PO Agent will encrypt its public key with the PO Server's public key and then transmit it to the PO Server 1 over the SPIPE 4. In this embodiment, the PO Server 1 sends a command to the PO Agent to post its public key to the PO Server. In other embodiments described herein, the PO Server 1 is passive and the PO Agent either sends GET or POST commands to the PO Server 1. To send an instruction to the PO Agent, the PO Server 1 may Ping the PO Agent. Typically, the PO Server 1 would ping the PO Agent with an instruction for the PO Agent to get a new policy. This would be desirable, for example, in situations where a virus scanner needs to be immediately updated. In one embodiment, each PO Agent would function as a mini-PO Server, i.e. , the PO Agent would be configured to listen on a high level port. The ping from the PO Server would comprise a "post" command from the PO Server 1 that would instruct the PO Agent to send the current configuration of its client to the PO Server 1.

In the preferred embodiment, each PO Agent in a system posts the current configuration of its client to the PO Server on regular intervals, as part of a routine check-in. The frequency of the intervals may be customized based on network bandwidth and other parameters. Where the software to be administered is virus software, more frequent check-ins provide a higher level of virus protection because the virus software can be updated more frequently. As the check-in frequency increases the bandwidth requirement for the network also increases. Thus, one advantage of the present invention is that the frequency of check-ins can be customized depending upon various network parameters and requirements.

Figure 5:
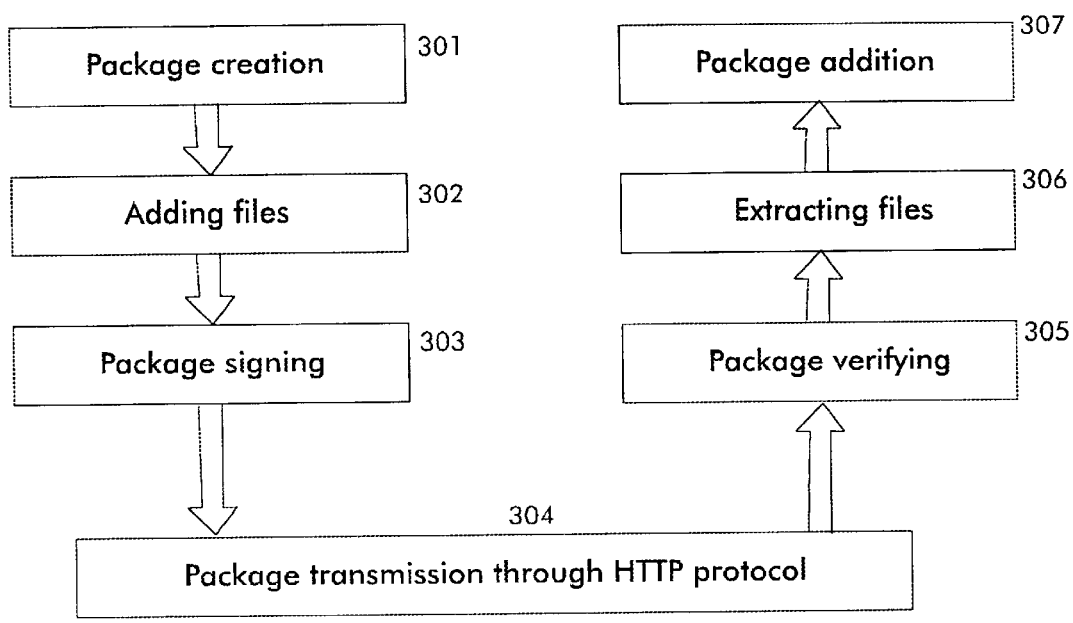
FIG. 5 is a flow chart illustrating the steps of creating a package, transferring the package over the SPIPE, and receiving the package.

During the routine check-in, the PO Agent also gets a new policy from the PO Server 1, if one exists. When the PO Agent checks-in, it sends its GUID to the PO Server 1. The PO Server 1 checks that GUID against a list of GUIDs in the LDAP database 2 for which the administrator has set a new policy. If there is a GUID in the LDAP database 2 that matches the GUID of the checking-in PO Agent, a new policy corresponding to that GUID is sent to the PO Agent. The policy or information relating to the policy may be placed in a package. FIG. 5 illustrates the typical logic involved in a package transfer. A package is created in accordance with the format specified in FIG. 2A (step 301). Next, files or other data is added (step 302). The package is then digitally signed with the creating entities private key (step 303). The package is then transmitted over the SPIPE 4 using HTTP, SMTP, MAPI, or WAP (step 304). The receiving entity verifies the signature appended to the package (step 305) and then extracts the data or files contained in the package (step 306). In some situations it may be advantages to extract the files at a later time. In this case, the package may be added to a linked list, or other suitable data structure, so that the contents of the package may be later extracted (step 307). This allows the Agent to examine the contents at time when more system resources on the client are available.

Figure 6:
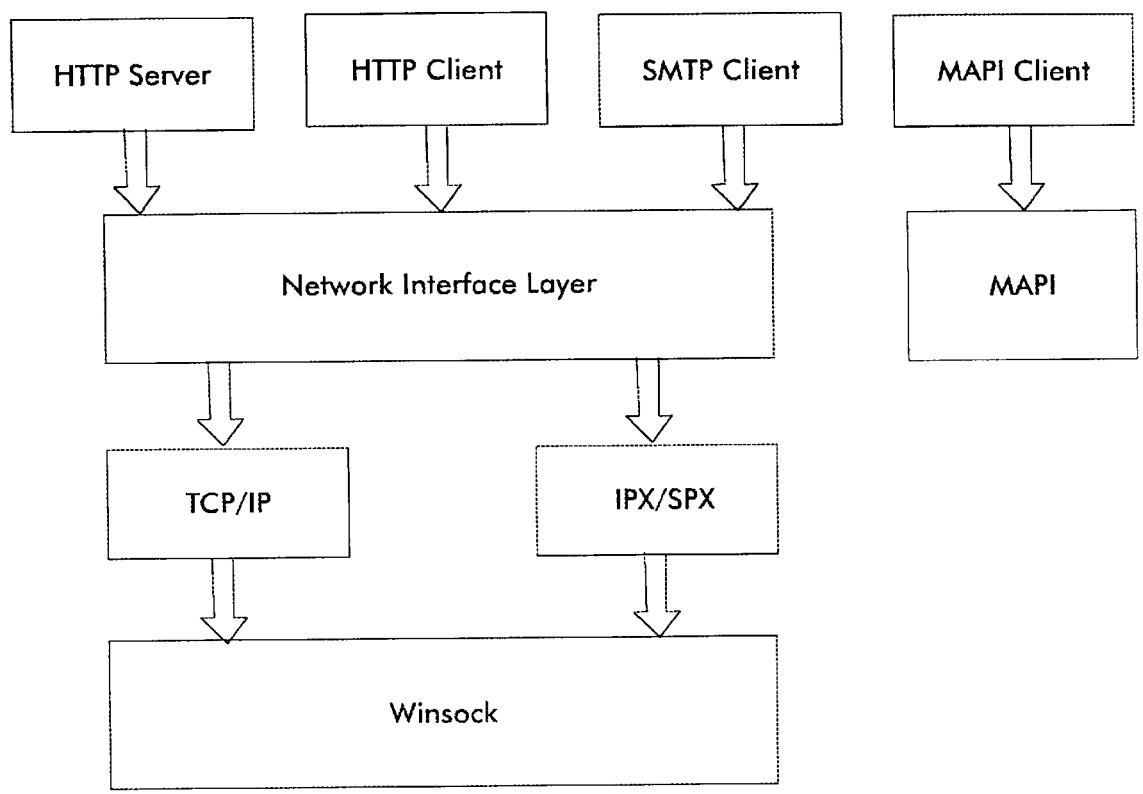
FIG. 6 illustrates a communication layer employed by preferred embodiments of the present invention.

Referring to FIG. 6, the communication layer is illustrated. In the preferred embodiment, the PO Server 1 is software that is deployed on a typical HTTP server 401 and adds, among other things, a Network Interface Layer (also known as Network Abstraction Layer) 402. The Network Abstraction Layer (NAL) is designed primarily to abstract all the network protocols. It should support TCP/IP (internet protocol) and IPX/SPX (novel network environment). In one embodiment the NAL creates common functions for SPIPE to interact with underlying the network protocol installed on the computer. The NAL checks all the available protocol libraries and activates them. The NAL loads all the network service provide DLLs and initializes them according to the type of communication requested. As is known in the art, DLL stands for Dynamic link library. It is a library used in Windows Operating Systems, which allows one to write functions and store them as DLL's. These functions can be used in multiple future applications. The SPIPE 4 may thus support TCP/IP and IPX/SPC network protocols, which are implemented in WIINSOCK on WIN32 platforms.

Referring now to FIG. 7, the SPIPE 4 contains several implementation modules. The SPIPE MAIN MODULE (naisp32.dll) 501, is responsible for exporting API's to applications such as the PO Server 1 and the PO Agent. MAIN MODULE 501 handles package maintenance as well as package transmission through lower layers. It is also implements the HTTP client in a customized manner for the SPIPE 4 and the SMTP client 502b, if used. The HTTP CLIENT/SERVER MODULE (nahttp32.dll) 502a implements the MAPI email client API's 502c and communicates with the SPIPE. The PGP DIGITAL AUTHENTICATION MODULE (naisgn32.dll) 503 provides a PGP digital signature algorithm, such as PGP SKD version 6.1, to authenticate signatures for packages.

The NETWORK INTERFACE ABSTRACT LAYER MODULE (nanif32.dll) 504 provides an abstraction layer interface to hide implemented differences between different network providers, e.g. TCP/IP and NETBIOS. Each network provider registers itself to the module so that the network interface can call provided functions. The TCP/IP and IPX/SPC NETWORK PROVIDER MODULE (nan32tcp.dll) 505 registers itself to the network interface layer and provides the NETWORK ABSTRACTION INTERFACE LAYER with the actual network socket communication callback functions.

In a particular embodiment, the PO Agent would, using HTTP client protocols 406, initiate all communications with the PO Server 1. In this embodiment, the PO Server 1 would be a passive entity. The PO Agent would retrieve packages from the PO Server 1 by issuing a command to "get" a package and would send packages to the PO Server 1 by issuing a command to "post" packages. In this embodiment the PO Server 1 cannot initiate communications with the PO Agent. As previously discussed, it may, however, under certain circumstances be desirable for the PO Server 1 to instruct the PO Agent to get a package. For example, it may be desirable to request that the PO Agent send its public key to the PO Server, or it may be advantageous to request that the PO Agent get new virus software from the PO Agent. To facilitate this above described pinging process may be used. In yet another embodiment, the PO Server 1 could be an active entity and send packages to the PO Agents without any prompt from the PO Agents.

Because, in one embodiment, the PO Server 1 is passive, the present invention can be employed on client computers that are part of Wide Area Networks ("WANs") that include firewalls and other security measures. Since most WANs allow their clients to browse the World Wide Web portion of the Internet, an SPIPE can be established between a client on a WAN containing a firewall, or other security measures, and a PO Server residing on the Internet. Because the PO Server 1 is—in this embodiment—passive, the firewall, or other security measures employed by the WAN, do not present problems in sending packages from the PO Server 1 to the PO Agents residing on the client computers. Thus, because the PO Agents use HTTP client architecture, they can POST and GET packages to and from the PO Server 1 even if a firewall is present on the WAN. HTTP client Application Provider Interfaces ("API's") are, in the preferred embodiment, implemented with the work queue described above to achieve asynchronous communications on the agent side.

In an alternative embodiment, the PO Agent may employ STMP client architecture and may use standard SMTP client functions to upload mail data asynchronously with the help of a work queue and state machine model design. Attachments may be converted into ASCII text using a standard Internet encoding scheme, such as MIME base-64 conversion. Thus, the sending of a single piece of mail to multiple users at once is fully supported by the present invention.

In yet another embodiment, MAPI client protocol may be employed to send MAPI mails through a Microsoft® exchange server. The SPIPE 4 uses a MAPI mail client to implement a separate thread that would impersonate a user by logging on to an NT server with the NT user's name and password. Preferably, the user would have ACT as an operating system. By impersonating the user, an SPIPE can be established and Log-on to an exchange server that is in a different NT domain. Thus, an SPIPE using e-mail protocols can be established when the PO Agent is on a different domain then the PO Server.

Table 3 below contains a list of example SPIPE export functions. The SPIPE export functions are used by PO Server and Agent. These functions do the jobs of package creation, maintenance and transmission between Server and Agent in secured way by signing the package using PGP digital authentication technology.

TABLE 3

SPIPE Exported Functions
naSPIPE_API
naSPIPE_Init(naHNET hnet, naHWQ hwq, naCHAR *lpszArchiveDir,
naPHSPIPE phspipe)
Initializes SPIPE structures and creates synchronization objects and initializes SPIPE v-table
Parameters:
    hnet
    handle to network. This handle was created by application using
    naNET_Create(naPHNET phnet, naHWQ hwq) function call from network interface layer
    (nanif32.dll)
    hwq
    handle to work queue. Work queue was created by application and it passes handle to
    spipe to queue jobs
    lpszArchiveDir
    Pointer to a null terminated string contains a directory where SPIPE can maintain
    packages
Returns:
    naS_OK if it successful else naE_FAIL if it fails
naSPIPE_API
naSPIPE_Release(naHSPIPE hspipe)
Releases SPIPE handle by freeing all the memory and also it closes all open handles
Parameters:
    hspipe handle to SPIPE
Returns:
    naS_OK if it successful else naE_FAIL if it fails
naSPIPE_API
naSPIPE_SetOption(naHSPIPE hspipe, naINT nOption, naPVOID pOptValue, naINT
nSize)
Sets the options for SPIPE
Parameters:
    hspipe handle to SPIPE
    nOption an integer variable contains following option values
- naSPIPE_OPT_SITEINFO
    Option for setting SITE info to SPIPE. In this case pOptValue contains buffer of
siteinfo.ini including e-mail info
    [SiteInfo]
    Version=20000111001950
    DefaultSite=POSite
    Sites=POSite
    [POSite]
    MasterSiteServer=MOONLAND
    Servers=MOONLAND
    [MOONLAND]
    DNSName=moonland.avdev
    ComputerName=MOONLAND
    LastKnownIP=161.69.82.51
    HTTPPort=81
    LDAPPort=389
    LDAPSSLPort=636
    UseSSLConnection=0
    MaxHttpConnection=10000
    SMTPEnabled=1
    SMTPServerAddress=gsent4s.avdev.nai.com
    UserName=sshetty
    MAPIEnabled=1
    ProfileName=test
    NTDomainName=North_America
    NTDomainUserName=sshetty
    NTDomainPassword=xxxxxx
    Site=POSite
- naSPIPE_OPT_HTTP_SERVER_HANDLE
    Option for registering HTTP server handle in SPIPE. In this case pOptValue
Contains handle to http server, which is created by application.
- naSPIPE_OPT_CALLBACK
    Option for registering application callback function. pOptValue contains pointer to
callback function.
- naSPIPE_OPT_CALLBACK_COOKIE
    Option for registering application callback cookie. pOptValue contains a cookie.
- naSPIPE_OPT_SET_GUID
    Option for setting GUID value. POptValue contains a guid value
- naSPIPE_OPT_SET_COMPUTER_NAME
    Option for setting computer name. POptValue contains computer name
- naSPIPE_OPT_PRIVATE_KEY
    Option for setting PGP private key. pOptValue contains key data and nSize
contains size of the binary key data
- naSPIPE_OPT_PUBLIC_KEY
    Option for setting PGP public key. pOptValue contains key data and nSize contains
size of the binary key data
- naSPIPE_OPT_SHUTDOWN_SPIPE TABLE 3-continued Option for turning on shutdown flag in SPIPE
    ☐  naSPIPE_OPT_IGNORE_DOWNLOAD
      Option for telling SPIPE to ignore download. It is used by SPIPE test agent tool
      only
Returns:
    naS_OK if it is successful else naE_FAIL if it fails
naSPIPE_API
naSPIPE_SendAndReceive(naHSPIPE hspipe, naINT nTransportType)
Initiates the process of sending and receiving packages between server and agents. Network data
transmission is totally asynchronous in SPIPE so function returns immediately
Parameters:
    hspipe handle to SPIPE
    nTransportType a integer value denotes the type of communication and they as follows
    ☐  naSPIPE_NETWORK_TRANSPORT
      Send and receive packages using network.
    ☐  naSPIPE_EMAIL_TRANSPORT
      Send and receive packages through email
Returns:
    naS_OK if the sending and receiving process started successfully else
    naE_FAIL if it fails
naSPIPE_API
naSPKG_Create(naHSPIPE hspipe, naPHSPKG phpkg)
Creates a SPIPE package handle by allocating memory for the package structure
Parameters:
    hspipe handle to SPIPE
    phpkg pointer to package handle contains newly created package
Returns:
    naS_OK if it is successful else naE_FAIL if it fails
naSPIPE_API
naSPKG_Delete(naHSPKG hpkg)
Frees package from memory by freeing all the pointers and deletes the package file
Parameters:
    hspipe handle to SPIPE
Returns:
    naS_OK if it is successful else naE_FAIL if it fails
naSPIPE_API
naSPKG_GetPackageSize(naHSPKG hspkg, naPULONG pnSize)
Returns size of the package including PGP signature.
Parameters:
    hspkg handle to package
    pnSize pointer to an integer contains package size
Returns:
    naS_OK if it is successful else naE_FAIL if it fails
naSPIPE_API
naSPKG_GetPackageDisplayName(naHSPKG hspkg, naCHAR *pszFile)
Returns the package file name
Parameters:
    hspkg handle to package
    pszFile pointer to a null terminated string contains the package file name
Returns:
    naS_OK if it is successful else naE_FAIL if it fails
naSPIPE_API
naSPKG_SetInfo(naHSPKG hspkg, naPCTSTR pszInfoName, naPVOID pInfoValue,
naINT nSize, naINT nFlags)
Sets the package info name and value for the package. Info name is always a null terminated
string but info value could be binary data too.
Parameters:
    hspkg handle to package
    pszInfoName pointer to a null terminated string contains the package info name or info
    type
    pInfoValue pointer to a binary data contains info value
    nSize integer variable contains size of the value data
    nFlags is optional flags
For Example: While agent sending agent public key package to Server it sets Info name is
"PkgType" and info value "AgentPubKeyPkg"
Returns:
    naS_OK if it is successful else naE_FAIL if it fails
naSPIPE_API
naSPKG_GetInfo(naHSPKG hspkg, naPCTSTR pszInfoName, naPVOID pszInfoValue,
naPINT pnSize, naINT nFlags)
Gets the package info value of the package by specifying the info name.
Parameters:
    hspkg handle to package
    pszInfoName pointer to a null terminated string contains the package info name or info
    type
    pInfoValue pointer to a binary data contains info value
    nSize integer variable contains size of the value data
    nFlags is optional flags
For Example: While agent sending agent public key package to Server it sets Info name is TABLE 3-continued "PkgType" and info value "AgentPubKeyPkg"
Returns:
    naS_OK if it is successful else naE_FAIL if it fails
naSPIPE_API
naSPKG_AddFile(naHSPKG hspkg, naPCTSTR pszDestFile, naPCTSTR pszSourceFile,
naINT nFlags)
Adds all the file name reference to the package because data is directly read from the file while
sending.
Parameters:
    hspkg handle to package
    pszDestFile pointer to null terminated string contains destination file name with optional
    path.
    PszSourceFile pointer to null terminated string contains source file name with full path
    nFlags an integer variable contains optional flags. A valid flag is
    naSPKG_FLAG_DELETE_WHEN_DONE if this is set files are deleted after package is
    transferred to remote machine successfully.
Returns:
    naS_OK if it is successful else naE_FAIL if it fails
naSPIPE_API
naSPKG_AddBuffer ( naHSPKG hspkg, naPVOID pBuff, naLONG nBuffSize,
naPCTSTR pszDestFile, naINT nFlags )
Adds buffer pointer reference to the package instead of file reference
Parameters:
    hspkg handle to package
    pBuff pointer to binary data contains file data
    nBuffSize a long variable contains buffer size
    pszDestFile pointer to null terminated string contains destination file name with optional
    path.
    NFlags an integer variable contains optional flags. A valid flag is
    naSPKG_FLAG_DELETE_WHEN_DONE if this is set buffers are freed after package is
    transferred to remote machine successfully.
Returns:
    naS_OK if it is successful else naE_FAIL if it fails
naSPIPE_API
naSPKG_SendViaEMail(naHSPKG hspkg, naPCTSTR pszDest, naPPGUID pguidArray,
naINT nFlags)
Sends package to the destination user through email
Parameters:
    hspkg handle to package
Returns:
    naS_OK if it is successful else naE_FAIL if it fails
naSPIPE_API
naSPKG_Unpack(naHSPKG hspkg, naPCTSTR pszUnpackPath, naINT nFlags)
Extracts files from the package. Once the package is arrived on the destination workstation files
are extracted from the package and copied to specified directory
Parameters:
    hspkg handle to package
    pszUnpackPath pointer to null terminated string contains directory where the files
    suppose to be copied
    nFlags optional flag
Returns:
    naS_OK if it is successful else naE_FAIL if it fails
naSPIPE_API
naSPIPE_SendEmail
    naHSPIPE    hspipe,
    naINT    nEmailType,
    naPCTSTR    pszSenderName,
    naPCTSTR    pszRecipients,
    naPCTSTR    pszMailSubject,
    naPCTSTR    pszMailMessage,
    naPCTSTR    pszAttachmentDisplayFileName,
    naPCTSTR    pszAttachmentFilePathName
Parameters:
    hspipe handle to spipe
    nEmailType is an integer variable specifies the type of the messaging system. The
    following mail types are used.
        NaSMTP_MAIL_TYPE if this is set mail is transported through SMTP protocol
        to the destination user.
        NaMAPI_MAIL_TYPE if this is set mail is transported through MAPI messaging
        system
    pszSenderName pointer to a null terminated string contains the email sender address
    pszRecipients pointer to a null terminated string contains one or more email recipients
    pszMailSubject pointer to a null terminated string contains email subject
    pszMailMessage pointer to a null terminated string contains mail message body
    pszAttachmentDisplayFileName pointer to a null terminated string contains attachment
    display name

TABLE 3-continued pszAttachmentFilePathName pointer to a null terminated string contains attachment file
name with full path
Returns:
    naS_OK if it is successful else naE_FAIL if it fails Provided below in Table 5 is a list of exemplary SPIPE HTTP server API's. The HTTP Server API's are library functions which PO Server can use it. Using these APIs functions PO Server can Start and Stop SPIPE HTTP Server. They also allow one to change HTPP listening port dynamically.

TABLE 5

SPIPE HTTP Server API's
NAHTTP32_API_(naRES)
naihttp_ServerInit
    PHNAI_HTTP_SERVER    phNaiHttpServer,
    naHNET    hnet,
    naHWQ    hwq,
    naHSO    hso,
    naCHAR    *pszRootDir,
    naPWORKFUNC    pCallbackProc,
    naPVOID    pCookie,
    naULONG    nMaxHttpConnection
Allocates memory and initializes http server data structure
Parameters:
    phNaiHttpServer contains a pointer to http server handle
    hnet contains a handle to network
    hwq contains a handle to work queue
    hso contains a handle to synchronization object
    pszRootDir pointer to a null terminated string contains www root directory
    pCallbackProc a optional pointer to a callback function
    pCookie a optional parameters contains callback cookie
    nMaxHttpConnection an integer variable contains number simultaneous connections
    server should accept. This value can also change by using naihttp_ServerSetOption(..)
Returns:
    naS_OK if it is successful else naE_FAIL if it fails
NAHTTP32_API_(naRES)
naihttp_StartServer
    HNAI_HTTP_SERVER    hNaiHttpServer,
    naINT    nAddrFam,
    naINT    nType,
    naINT    nProtocol,
    naPCHAR    pszAddress,
    naINT    nPort,
    naINT    nBackLog,
    naINT    nFlags
Creates a socket and listens on HTTP port and this will start HTTP server.
Parameters:
    pNaiHttpServer is a handle to http server
    nAddrFam is a protocol family, i.e., naNET_AF_INET
    nType is type of connection ( currently supports naNET_STREAM only)
    nProtocol is a type of protocol (currently supports naNET_TCPIP naNET_IPXSPX)
    pszAddress pointer to a null terminated string contains server local bind address
    nPort is an integer variable contains port number
    nBackLog is an integer variable contains socket backlog queue size
    nFlags is an optional flag
Returns:
    naS_OK if it is successful else naE_FAIL if it fails
NAHTTP32_API_(naRES)
naihttp_ServerRelease
    HNAI_HTTP_SERVER hNaiHttpServer
frees all the memory
Parameters:
    hNaiHttpServer is a handle to http server
Returns:
    naS_OK if it is successful else naE_FAIL if it fails
NAHTTP32_API_(naRES)
naihttp_StopServer
    HNAI_HTTP_SERVER hNaiHttpServer
Stops the server by closing the listening socket
Parameters:
    hNaiHttpServer is a handle to http server
Returns:
    naS_OK if it is successful else naE_FAIL if it fails
NAHTTP32_API_(naRES)
naihttp_ServerSetOption(HNAI_HTTP_SERVER hNaiHttpServer, naINT nOption, TABLE 5-continued

```
naPVOID pOptValue, naINT nSize );
Sets options for HTTP Server. Currently it supports only to set option for Maximum number of
concurrent HTTP connections.
Parameters:
    hNaiHttpServer is a handle to http server
    nOption is an integer variable contains option value
    pOptValue contains an option value
    nSize contains size of the value in bytes
Returns:
    naS_OK if it is successful else naE_FAIL if it fails
```

Although the present invention has been described with respect to preferred embodiments thereof, those skilled in the art will note that various substitutions may be made to those embodiment described herein without departing from the spirit and scope of the present invention. Thus, the invention is not limited by the illustrative embodiments disclosed herein.

What is claimed:

1. A method for maintaining one or more client computers over a public network, the method comprising:

maintaining one or more policies for a client computer;
   receiving a first package from a client over the public network;
   verifying that the first package was received from an authorized client and that the package has not been altered utilizing at least one key;
   determining whether a policy has been set for the client;
   if a policy has been established for the client, generating a second package, the second package containing one or more policies for the client; and
   transferring the second package to the client computer using HTTP;
   wherein the policies comprise virus signature files for virus scanning software, and an indication of types of files to scan, and are stored in an LDAP database;
   wherein the virus signature files and the indication of types of files to scan are different for different client computers;
   wherein a server maintains a first work queue for processing information posted by the client computers to the server;
   wherein the server maintains a second work queue for processing information posted by a system administrator;
   wherein the second work queue is a high priority work queue.

2. A method as in claim 1, wherein the first package is digitally signed by the client.

3. A method as in claim 1, wherein the first package includes information identifying the client.

4. A method as in claim 3, wherein the first package further includes information about the current configuration of the client.

5. A method as in claim 1, further comprising the step of prompting the client to send a first package to the server.

6. A method for maintaining one or more client computers over a public network, the method comprising:

maintaining an LDAP database of one or more policies for one or more clients;
   determining whether a policy has been set for one or more clients;
   if a policy has been established for the client, generating a secure package utilizing at least one key, the package containing one or more policies for the client; and
   transmitting the secure package to the client computer over the public network using HTTP;
   wherein the policies comprise virus signature files for virus scanning software, and an indication of types of files to scan;
   wherein the virus signature files and the indication of types of files to scan are different for different client computers;
   wherein a server maintains a first work queue for processing information posted by the client computers to the server;
   wherein the server maintains a second work queue for processing information posted by a system administrator.
   wherein the second work queue is a high priority work queue.

7. A method as in claim 6, wherein the step of generating a secure package comprises the step of digitally signing the package.

8. A method as in claim 6, wherein the determining step is initiated by a package posted by the particular client.

9. A method as in claim 8, wherein the package is posted by the particular client in response to an issued prompt.

10. A secure method for sending packages of information from a server to a plurality of client computers, the method comprising the steps of:

configuring a server to create a package of information;
   providing the server with a private/public encryption key pair;
   providing the clients with the server's public encryption key;
   digitally signing the package with the server's private encryption key;
   in response to a get command from the client, transferring the digitally signed package to the client over a public network using HTTP;
   upon receipt of the package by the client, verifying the digital signature on the package using public encryption key for the server; and
   if the signature verifies, examining the contents of the package;
   wherein each package includes policies that comprise virus signature files for virus scanning software, and an indication of types of files to scan, and are stored in an LDAP database;
   wherein the virus signature files and the indication of types of files to scan are different for different client computers, as determined by a system administrator;
   wherein the server maintains a first work queue for processing information posted by the client computers to the server;

wherein the server maintains a second work queue for processing information posted by the system administrator;

wherein the second work queue is a high priority work queue.

11. A system for maintaining a network of computers comprising:

a plurality of client computers, the client computers containing software for verifying digital signatures;

a server for setting policy for the client computers, the server containing software for digitally signing packages;

an LDAP database, the database interfaced with the server, the database further containing information that may be inserted into one or more packages for one or more of the client computers and one or more communication links over a public network between the plurality of client computers and the server for sending a digitally signed package containing information for the client computers using HTTP;

wherein the packages include policies that comprise virus signature files for virus scanning software, and an indication of types of files to scan;

wherein the virus signature files and the indication of types of files to scan are different for different client computers, as determined by a system administrators wherein the server maintains a first work queue for processing information posted by the client computers to the server;

wherein the server maintains a second work queue for processing information posted by the system administrator;

wherein the second work queue is a high priority work queue.

12. A computer system for maintaining setting policy for a plurality of client computers comprising:

an LDAP database containing policies for one or more client computers;

a server, the server interfaced with the database and having software for creating and digitally signing policy containing packages;

a console under the control of a system administrator, the console interfaced with the server and containing software for communicating with the server and for sending policies to the databases for one or more client computers; and software residing on the client computers, the software having a function for verifying the server's digital signature and a function for sending packages containing information about a client's configuration to the server;

wherein the policies comprise virus signature files for virus scanning software, and an indication of types of files to scan;

wherein the policies are delivered using HTTP;

wherein the virus signature files and the indication of types of files to scan arc different for different client computers, as determined by a system administrator;

wherein the server maintains a first work queue for processing information posted by the client computers to the server;

wherein the server maintains a second work queue for processing information posted by the system administrator;

wherein the second work queue is a high priority work queue.

13. A system as in claim 12, wherein the clients software has a function for digitally signing packages and the server software has a function for verifying the digital signature of the clients.

14. A system as in claim 12, wherein the clients have public/private encryption key pairs for digitally signing the packages containing information about the clients' configuration and the server has the public keys for the clients for verifying the clients' signatures.

15. A system as in claim 13, wherein the server is configured using state machine logic.

* * * * *

UNITED STATES PATENT AND TRADEMARK OFFICE
CERTIFICATE OF CORRECTION

| | | |
|---|---|---|
| PATENT NO. | : 6,799,197 B1 | Page 1 of 1 |
| APPLICATION NO. | : 09/652089 | |
| DATED | : September 28, 2004 | |
| INVENTOR(S) | : Shetty et al. | |

It is certified that error appears in the above-identified patent and that said Letters Patent is hereby corrected as shown below:

col. 21, line 46, change "a" to --the--;
    col. 22, line 27, change "a" to --the--;
    col. 22, line 28, change "." to --;--;
    col. 23, line 27, change "administrators" to --administrator;--;
    col. 24, line 19, change "arc" to --are--.

Signed and Sealed this

Fifteenth Day of February, 2011

David J. Kappos
*Director of the United States Patent and Trademark Office*